United States Patent Office 3,135,597
Patented June 2, 1964

3,135,597
TREATMENT OF COMPLEX ORES
Nathan W. Davis, 3474 S. 23rd St. E.,
Salt Lake City 6, Utah
No Drawing. Filed Feb. 7, 1962, Ser. No. 171,587
3 Claims. (Cl. 75—2)

This invention relates to hydrocarbons obtained by the destructive distillation of Gilsonite, to products made from the distillates, and to uses of said products, particularly in connection with processes for separating minerals from complex ores.

It is an object of this invention to destructively distill Gilsonite and to obtain therefrom various fractions each of which are separate and distinct insofar as they have different physical and chemical properties.

It is a further object of this invention to use one of these fractions in the preparation of a product useful in ore separation processes.

Gilsonite is a black, brittle, lustrous mineral consisting of hydrocarbons, chiefly found in the southwestern section of the United States, principally in Utah and Colorado.

DESTRUCTIVE DISTILLATION OF GILSONITE

In a steel still directly heated by means of electric resistance units is placed 50 pounds of Gilsonite M.P. 320–350° F. This still is connected to a water cooled condenser and the following fractions obtained at the temperatures indicated. For the purpose of further reference in this specification, these fractions have been given the following numbers.

Table of Gilsonite Distillates Using a 320° F. Melt Point Gilsonite

The following distillates are obtainable:

| Temperature, °F. | No. | Color | Specific Gravity at 70° F. |
|---|---|---|---|
| 326 to 329 | 1 | clear | 0.61 |
| 330 to 334 | 2 | brownish | 0.73 |
| 339 to 341 | 3 | clear slight red | 1.72 |
| 343 to 345 | 4 | clear | 1.71 |
| 345 to 355 | 5 | do | 0.053 |
| 355 to 360 | 6 | brownish black | 1.31 |
| 360 to 366 | 7 | clear | 0.63 |
| 369 to 374 | 8 | do | 0.93 |
| 375 to 380 | 9 | do | 1.12 |
| 380 to 381 | 10 | reddish brown | 1.19 |
| 385 to 397 | 11 | do | 2.11 |
| 390 to 393 | 12 | clear | 0.74 |
| 395 to 400 | 13 | do | 0.87 |
| 410 to 417 | 14 | do | 0.89 |
| 420 to 423 | 15 | slightly brown clear | 0.79 |
| 430 to 438 | 16 | reddish brown | 0.52 |
| 440 to 443 | 17 | brown | 0.90 |
| 445 to 451 | 18 | clear | 0.67 |
| 455 to 456 | 19 | brown | 2.69 |
| 460 to 465 | 20 | clear | 0.054 |
| 465 to 470 | 21 | clear brownish | 0.093 |
| 478 to 483 | 22 | brown | 0.94 |
| 485 to 490 | 23 | clear | 0.0041 |
| 490 to 493 | 24 | clear reddish | 0.005 |
| 495 to 500 | 25 | brownish red | 0.95 |
| 505 to 509 | 26 | clear | 0.17 |
| 510 to 512 | 27 | do | 0.19 |
| 518 to 520 | 28 | brown | 1.03 |
| 525 to 535 | 29 | do | 0.039 |
| 542 to 550 | 30 | brownish clear | 0.73 |
| 570 to 573 | 31 | clear | 0.92 |
| 579 to 582 | 32 | do | 0.53 |
| 583 to 585 | 33 | do | 0.72 |
| 586 to 590 | 34 | brown | 2.007 |
| 595 to 600 | 35 | do | 2.09 |
|  | 36 | gray black dust, when cool, remaining in retort. Weight 120 gram to cu. inch. |  |

More fraction are obtainable but they are not part of this invention.

EXAMPLE 1

A carbon silicate acid is obtained from the 16 fraction by proceeding as follows.

In a retort that will stand 600 pounds' pressure, place:
1 gal. distillate, fraction 16
12 oz. xylene (dimethylbenzene)
2 oz. triethanolamine (trihydroxyltriethylamine)
6 oz. silicon mix (finely ground silicon dioxide 100 mesh)

Heat to 250° F. maintaining a pressure of 30 pounds per square inch with continual agitation for one hour.

The retort is then allowed to cool, maintaining the agitation, and when cool, 1 gallon of distilled water is added. This is then distilled and three fractions taken at 230–240° F., 260–270° F. and 310–315° F., using a water cooled condenser. The last fraction, that is, the one boiling at 310–315° F. is a fluid brownish liquid having a specific gravity of .24 at 70° F., and is then diluted with mineral spirits solvent in the ratio of 1 part distillate to 80 parts solvent. The following solvents have also proven satisfactory; Stoddard Solvents manufactured by the Standard Oil Company and turpentine. This material is referred to in this application as Z16. It is a hydrocarbon silicon penetrating oil, a silicon carbonate or carboxy acetic acid.

Similar destructive distillaiton of coal or crude oil may be run and used in place of the 16th fraction from the destructive distillation of Gilsonite, after the addition of xylene, triethanolamine and the silica and distilled. The fraction boiling at 260° F. for crude oil and 310° F. for coal can be used after dilution with mineral spirits.

EXAMPLE 2

A product is similarly obtained by treating the #6 fraction as follows.

Mix in a heated retort with agitation:

1 gal. of #6 fraction (an oily brown, black material having a specific gravity of 1.31 at 70° F.)
7 oz. triethanolamine (trihydroxytriethylamine)
1 lb. silicon mix (finely ground silicon dioxide 100 mesh)
20 oz. xylene (dimethylbenzene)

Mix and heat under pressure to 300° F. maintaining a pressure of 20 lbs. per square inch with continual agitation for one hour. Cool and add 1 gal. of distilled water and 1 pt. turpentine. Heat with agitation to 256° F. and distill. An oily distillate having a specific gravity of .63 at 70° F. is obtained. This is a very toxic material and may be used in the preparation of insecticides.

ORE SEPARATION PROCESS

This process is adapted to separation of complex mineral ores after the raw ore has been crushed and ground. Complex metal bearing ores invariably contain a certain amount of chemically bound calcium according to the general experience of the trade. The calcium-containing portion acts as a binder for the particles of other ore components. The present process is adaptable to all types of calcium-containing complex minerals including radioactive material, ferrous and nonferrous minerals.

Steps in the Process

STEP NO. 1

The calcium-bearing complex ore as it comes from the ball mill or other grinding device at the required mesh is placed in a heated tank equipped with agitating means, for conditioning, wherein the ore material is mixed with warm water to a specific gravity of 60. The ore headings are first tested to determine the proportion and kind of calcium complex present in order to ascertain the amount and type of acid necessary in the process. If the ore headings do not contain calcium carbonate, sulfuric acid is then mixed with the material in an amount equal to 1 percent of the calcium content of the ore material at the same time raising the temperature of the slurry to 200°

F. Said temperature should not be attained however until after completion of the second step.

STEP NO. 2

During the process described above in step No. 1, when the ore has ceased foaming, there is introduced into the slurry the material previously described in the specification as Z16, in an amount equivalent to ¼ of 1 percent of the sulfuric acid previously used. Then continue to mix or agitate the slurry for twenty minutes or until the temperature of the slurry attains 150° F., whichever event occurs first.

STEP NO. 3

Now add hydrochloric acid in an amount equal to ¼ of the sulfuric acid previously added. Continue to mix or agitate for thirty minutes or until the slurry reaches the temperature of 200° F., whichever occurs first.

STEP NO. 4

Now introduce sodium bicarbonate into tank No. 2 in an amount by weight equivalent to twice the number of pounds of sulfuric acid by weight which has been previously added, then empty tank No. 1 into tank No. 2 and slowly agitate.

STEP NO. 5

Then add potassium iodide in an amount equivalent of 2 percent of the sodium previously added.

STEP NO. 6

Then add and mix into the slurry aluminum nitrate in an amount equivalent of 1 percent of the potassium iodide previously used. The agitation is now discontinued and the material allowed to settle. A scum forms on the top which is skimmed off and introduced into a separate tank No. 3 containing the same amount of sodium sulfate as there was potassium iodide used previously. Here the scum or material skimmed off settles and the precipitant is drawn off into evaporating tanks. This is the radioactive material. This step may be omitted in event it is not desired to recover the radioactive material contained in the heading ore material.

STEP NO. 7

If the ore headings contain carbon in the form of calcium carbonate, use nitric acid in place of sulfuric acid as described in the preceding steps. In general the type and quantity of acid is determined by the amount of calcium carbonate or other calcium compounds contained in the headings, and the mesh or size of the grind. The inorganic acid used tends to also dissolve the ore particles, as well as the binder, and it is desirable to minimize the time of such exposure. By adding the Z16 penetrating oil in accordance with step No. 2 above, the time of exposure is reduced, resulting in an upgrading of the concentrates. The Z16 penetrates the binding material very readily and combines with the acid to more speedily free the ore particles from each other, and thus reduces the amount of acid necessary.

STEP NO. 8

The aforesaid steps permit the separation of various ores in the precipitant material contained in tank No. 2 or the soda tank as described in step No. 4. The various ore particles are free and independent of each other and can be concentrated by conventional methods such as tabling or flotation.

Many minor changes could be made in the above process as described in this application. All such changes come within the scope of this invention. The important feature is the introduction of the Z16 material and its faculty to penetrate through and cause separation at the microscopic seams or contact points between the various kinds of ore particles which are commonly found united together in most ore material.

This application is in part a continuation of my application, Serial No. 846,524, filed September 21, 1959, now abandoned, which is a division of my prior application, Serial No. 604,085, filed August 15, 1956, now Patent No. 3,003,944, granted October 10, 1961.

What is claimed is:

1. A process for separating minerals from calcium-containing complex ores which comprises grinding the ores to a sufficiently fine mesh to form a slurry with warm water acidulated with an inorganic acid in an amount equal to approximately 1 percent of the calcium content of the ore, adding thereto with agitation a product obtained by admixing with a fraction obtained by the destructive distillation of Gilsonite, and boiling between 430° F. to 438° F., xylene, triethanolamine and finely ground silicon dioxide, adding hydrochloric acid in an amount equal to about one-fourth of the inorganic acid previously added, heating the entire mixture under pressure, cooling the thereby obtained material, adding distilled water thereto and then fractionally distilling the aqueous mixture, and separating that fraction boiling between 310° F. and 315° F., said product being added to said slurry in an amount equivalent to ¼ of 1 percent of the acid content of the slurry, heating to 200° F. and adding sodium bicarbonate in an amount by weight equivalent to twice the amount of acid in the slurry, continuing agitation and adding potassium iodide in an amount equivalent to 2 percent of the sodium bicarbonate followed by aluminum nitrate in an amount equivalent to 1 percent of potassium iodide, permitting the materials to settle and skimming off the scum formed, adding to the separated scum sodium sulphate in an amount equal to the potassium iodide previously added, and drawing off the precipitate formed.

2. A process as described in claim 1 wherein said inorganic acid is sulfuric acid.

3. A process as described in claim 1 wherein said inorganic acid is nitric acid.

References Cited in the file of this patent
UNITED STATES PATENTS
1,197,590     Bacon _____ Sept. 12, 1916